June 16, 1964     D. E. BEACH     3,137,457
CAMERA TAKE-UP REEL RELEASE MECHANISM
Filed Aug. 17, 1961     2 Sheets-Sheet 1

David E. Beach
INVENTOR.

BY R. Frank Smith
Steve W. Grambau
ATTORNEYS

June 16, 1964    D. E. BEACH    3,137,457
CAMERA TAKE-UP REEL RELEASE MECHANISM
Filed Aug. 17, 1961    2 Sheets-Sheet 2
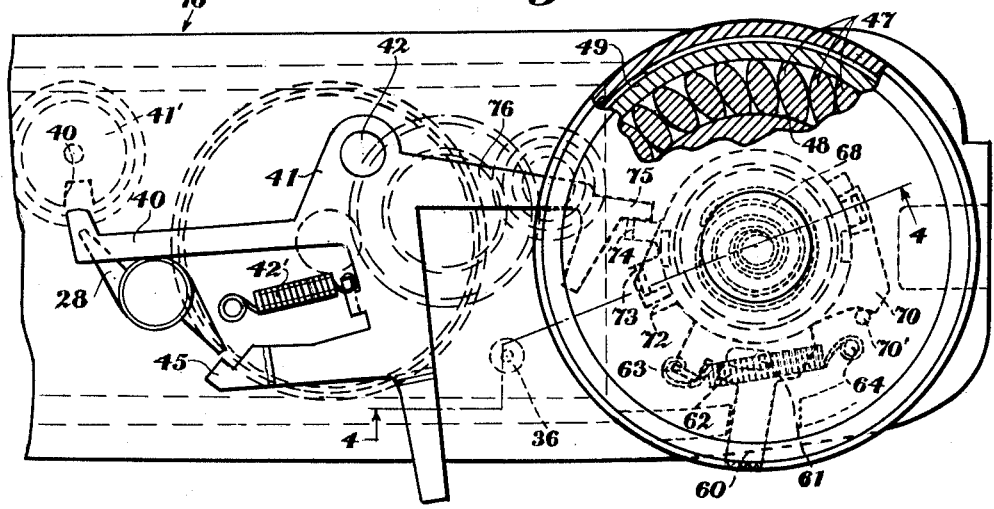
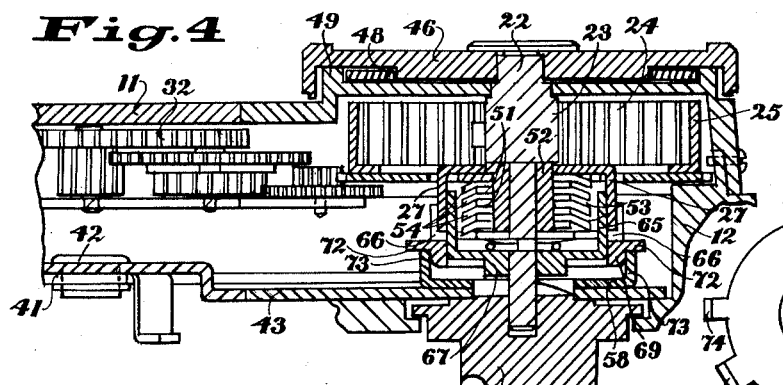
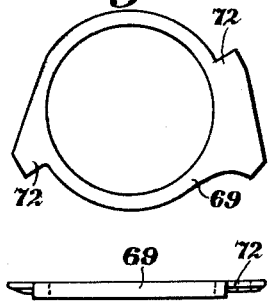
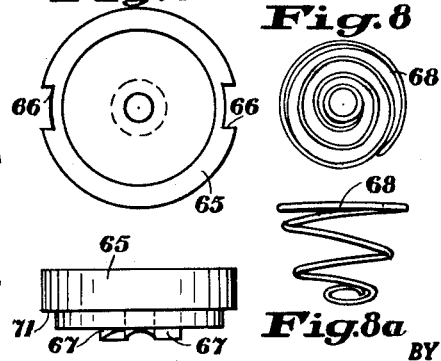
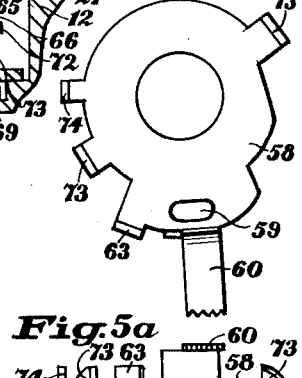
David E. Beach
INVENTOR.
BY R. Frank Smith
Steve W. Grimbau
ATTORNEYS

United States Patent Office 3,137,457
Patented June 16, 1964

3,137,457
CAMERA TAKE-UP REEL RELEASE MECHANISM
David E. Beach, Rochester, N.Y., assignor to Eastman Kodak Company, Rochester, N.Y., a corporation of New Jersey
Filed Aug. 17, 1961, Ser. No. 132,076
6 Claims. (Cl. 242—71.6)

This invention relates generally to roll film cameras, and more specifically to a take-up reel release mechanism for a camera to permit rewinding of the exposed film into the film supply cassette.

It is therefore one of the primary objects of the present invention to provide an improved take-up reel release mechanism for a roll film camera to permit rewinding of the exposed film from the take-up reel to the film supply cassette.

Another object of the invention is to provide an improved reel release mechanism for a camera that is of simple design and construction, thoroughly efficient in operation, and economical to manufacture.

Objects and advantages other than those set forth above will be apparent from the following description when read in connection with the accompanying drawings, in which:

FIG. 3 is a fragmentary view similar to FIG. 1 showing the reel release mechanism in a reel disengaged position;

FIG. 4 is a fragmentary section view taken along line 4—4 of FIG. 3;

FIG. 5 is a top plan view of a rewind lever;

FIG. 5a is a side elevation view of the rewind lever of FIG. 5;

FIG. 6 is a top plan view of a cam member;

FIG. 6a is a side elevation view of the cam member of FIG. 6;

FIG. 7 is a top plan view of a drive member;

FIG. 7a is a side elevation view of the drive member of FIG. 7;

FIG. 8 is a top plan view of a spring; and

FIG. 8a is a side elevation view of the spring of FIG. 8.

Figure 1:
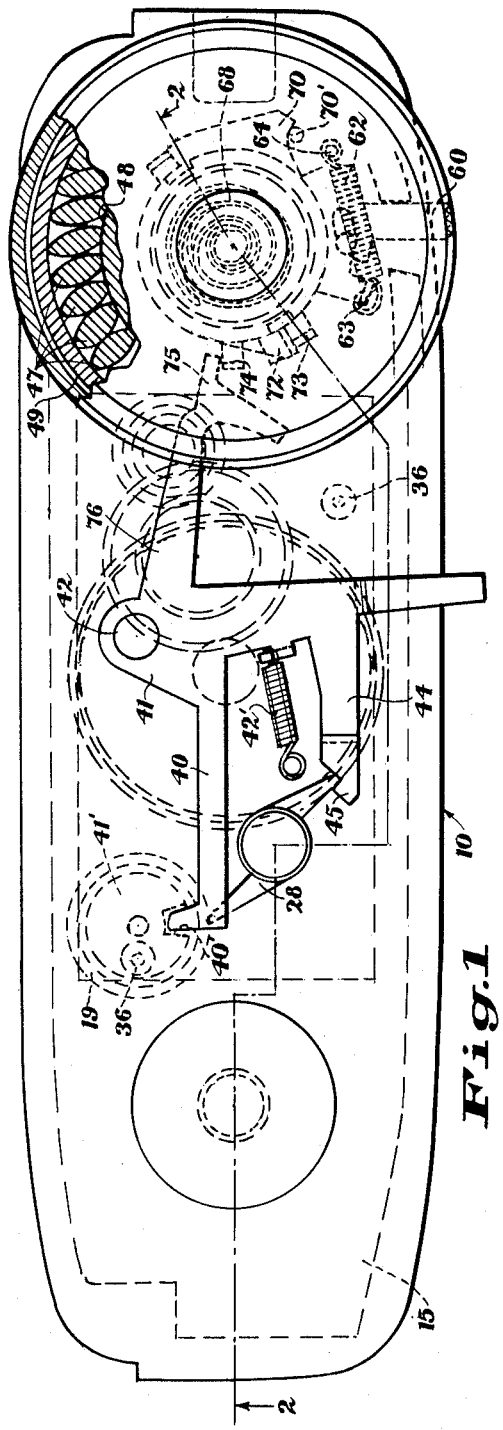
FIG. 1 is a bottom view of the camera housing showing the reel release mechanism constructed in accordance with the present invention, and the parts in a reel driving position.
Figure 2:
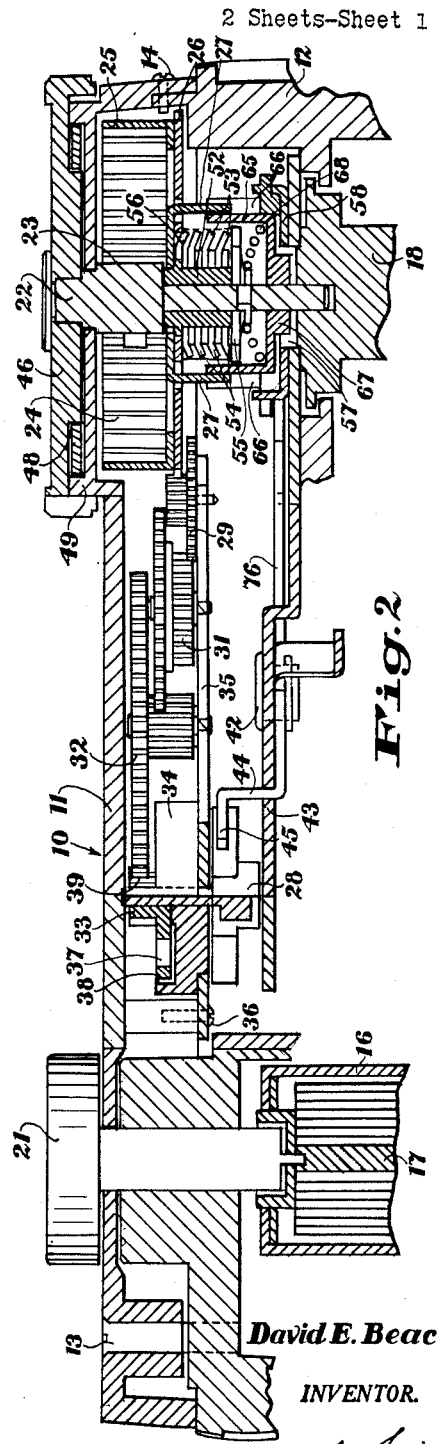
FIG. 2 is a fragmentary section view taken along line 2—2 of FIG. 1.

As shown in the drawings, a preferred embodiment of the invention is incorporated in a roll film camera 10 having a cover plate 11 secured to the camera body 12 by screws 13, 14 as seen in FIG. 2. The body 12 has a film supply chamber 15 for receiving a known type of cassette 16 containing a supply roll 17 of film, a take-up spool 18, and a lockable measuring roll 19, shown dotted in FIG. 1, for transporting a film strip from the film supply roll 17, one exposure frame at a time, to the film take-up spool 18. Since the mechanism for freeing the roll 19 for the winding operation does not form a part of the invention, and since conventional means of the type disclosed in U.S. Patent 2,936,687 to Bundschuh et al. may be used to accomplish this, it has not been described or shown. In a camera of this type, after all the exposure frames have been taken, the exposed film strip is rewound from the take-up spool 18 back into the film supply cassette 16 by means of a rewind knob 21 drivingly connected to the film supply roll 17 prior to removal of the cassette 16 from the camera for development or processing, as is well known.

The camera 10 disclosed in the drawings is designed to automatically advance the film strip in the camera between successive exposures. In cameras of this type, as disclosed in U.S. Patents 1,448,414 to Mietzelfeld and 2,182,133 to Moomaw, the shutter tripping mechanism is connected to the film advance mechanism so that actuation of a shutter release button, not shown, to make an exposure also actuates the film advance mechanism to advance the film one exposure frame. The film advance mechanism of this camera 10 as seen in FIGS. 1 and 4, comprises a shaft 22 journaled in cover plate 11 and having a portion 23 of increased diameter, about which a "clock" type spiral spring 24 is mounted with one end thereof secured to portion 23 and the opposite end, not shown, secured to an open ended housing 25 within which spring 24 is contained. The housing 25 rests against a drive gear 26, and has a pair of struck-out prongs 27 extending through complementary openings in gear 26 for drivingly connecting the two upon rotation of housing 25. The drive gear 26 is in turn drivingly connected to a double bladed fan 28 through a train of gears 29, 31, 32, 33 and a governor of known type having a cup-shaped part 34 fixed to a support plate 35 which is secured to the cover plate by screws 36 and a rotatable part 37 having arms 38 subject to centrifugal force to urge the arms into engagement with the cup-shaped part 34. The gears 29, 31 and 32 are rotatably mounted on spindles secured to support plate 35, and gear 33, governor part 37, and fan 28 are secured to a shaft 39 rotatably journaled in governor part 34. A control lever 41 is pivotally mounted on a post 42 secured to a mounting plate 43 fixed to camera body 12, and has an arm 44 provided with a shoulder 45 at one end to form a stop means adapted to be engaged by one of the blades of fan 28 as best seen in FIGS. 1 and 2. Lever 41 has another arm 40, the end of which is adapted to cooperate with a notch 40' in a disk 41', which is secured to the same shaft as measuring roll 19. A spring 42' interposed between lever 41 and a post on plate 43 urges lever 41 in a latching position causing shoulder 45 to intercept and stop fan 28, and end of arm 40 to lock measuring roll 19. It is clear that when one of the blades of fan 28 is in engagement with shoulder 45 as seen in FIG. 1, the gear train 29, 31, 32 and 33, drive gear 26 and housing 25 are effectively locked, and drive spring 24 may be wound upon rotation of shaft 22 by means of a knurled turning knob 46 secured thereto. Any suitable one-way clutch comprising, for example, sprags 47 as seen in FIG. 1 interposed between a shoulder 48 of turning knob 46 and an annular projection 49 on cover plate 11, permits turning of knob 46 in one direction to wind up spring 24, but prevents knob 46 from turning in the opposite direction, thus preventing wound spring 24 from unwinding.

To assure that drive spring 24 cannot be overwound, and will always have sufficient energy to advance the film a full exposure frame, a series of washers 51 are loosely mounted on a sleeve 52 keyed to shaft 22 and serve to limit the amount spring 24 may be wound and unwound. These washers 51 are of the type incorporated in spring driven clocks, each having a single radially extending lug 53 and a diametrically opposed, radially extending, downwardly bent lip 54. A drive washer 55 is secured to shaft 22, and drivingly engages the lip 54 of the washer 51 adjacent thereto. Upon rotation of knob 46 and drive washer 55, the first or adjacent washer 51 will be turned through a single revolution at which time its lug 53 will engage the lip 54 of the second washer 51. After the second revolution is completed, the lug 53 of the second washer 51 engages the lip 54 of the third washer 51, etc., until all the washers 51 have been turned through a complete revolution, and the lug 53 of the last washer engages a struckout lip 56 from drive gear 26 which is prevented from turning by shoulder 45. At this point, since lip 56 and gear 26 are fixed by virtue of shoulder 45 and fan 28, and all of the lost motion in the washers 51 is taken up, it is impossible to turn knob 46 any further. During run down of spring 24, the washers 51 operate in the same way, except in reverse direction and order with drive gear 26 turning and the knob 46 and drive washer 55 fixed.

Coming now to the main feature of the invention, the take-up spool 18 has a pair of teeth 57 at one end extending through mounting plate 43 as seen best in FIGS. 2 and 4. A rewind lever 58 seen best in FIGS. 5 and 5a encircles teeth 57, and has an arcuate slot 59 co-operating with a lug 61 on mounting plate 43 to limit pivotal movement of lever 58 around teeth 57 by means of a handle 60 between a normal inoperative position, and an operative or rewind position. A spring 62 is interposed between a turned-up lug 63 of lever 58 and a post 64 on plate 43 for normally urging rewind lever 58 counterclockwise and into the inoperative position. A cup-shaped drive member 65, seen best in FIGS. 7 and 7a, is loosely mounted on shaft 22, and has a pair of diametrically opposed, axially extending peripheral slots 66 for receiving corresponding prongs 27. The lower end of drive member 65 has a pair of projecting drive teeth 67 adapted to drivingly engage corresponding teeth 57 on spool 18. A helical spring 68 encircles shaft 22, and is interposed between the partially closed end of member 65 and drive washer 55 for axially urging drive member 65 and teeth 67 into meshing engagement with teeth 57. An annular lifting ring 69, seen best in FIGS. 6 and 6a, encircles drive member 65, and has an abutment 70 engaging post 70' on plate 43 to prevent clockwise movement of ring 69. Ring 69 is further interposed between a shoulder 71 of member 65 and rewind lever 58. The ring 69 further has a pair of diametrically opposed projections 72 engageable by diametrically opposed beveled lugs 73 on rewind lever 58. Movement of rewind lever 58 from its normal inoperative position to its rewind position causes the beveled lugs 73 to engage lifting projections 72 and axially move lifting ring 69 and drive member 65 against the bias of spring 68, thereby disengaging teeth 57, 67 and effectively disconnecting the driving mechanism from spool 18. Consequently, as long as rewind lever 58 is held in the rewind position, rewind knob 21 may be turned to rewind the film strip from spool 18 back into the film supply cassette 16. The rewind lever 58 further has a lip 74 laterally extending therefrom as best seen in FIG. 1 adapted to engage the end 75 of an arm 76 of control lever 41 and move it into its inoperative position upon movement of rewind lever 58 into its rewind position. This withdraws the end of arm 40 from notch 40' of measuring roll 19 to permit rewinding, and further disengages shoulder 45 from fan 28 releasing the drive mechanism and permitting the energy stored in spring 24 to be dissipated to the limit permitted by washers 51.

The invention has been described in detail with particular reference to a preferred embodiment thereof, but it will be understood that variations and modifications can be effected in the scope of the invention as described hereinabove and as defined in the appended claims.

I claim:

1. In an improved reel release mechanism for a roll film camera, the combination comprising: a supply roll for film; a take-up reel adapted when rotated in one direction to advance a film from said supply roll to said reel for exposure; a measuring member movable by said film as it is advanced; a latch for releasably holding said measuring member against movement when a predetermined length of film has been advanced; stored energy means adapted when released to rotate said reel in said one direction; means for stopping said stored energy means after it has been released and has rotated said reel to advance said predetermined length of film; means for rotating said supply roll in a direction to rewind the film from said reel back onto said supply roll after a given portion of the film has been exposed; and means interconnecting said stored energy means and said reel and movable between a normal first position in which it drivingly connects said stored energy means to said reel, and a second position in which it disables said stopping means to allow said stored energy means to dissipate its energy, releases said latch to free said measuring member, and disengages said stored energy means from said reel whereby said reel is free to rotate in said opposite direction upon operation of said supply roll rotating means to rewind the exposed film back onto said supply roll.

2. The invention according to claim 1 wherein said stored energy means comprises a spring motor, and a drive member driven by said spring motor and movable to and from a reel driving position; and said interconnecting means comprises a cam member co-operating with said drive member to control its movement to and from said reel driving position.

3. The invention according to claim 2 wherein said drive member and reel are in axial alignment and said drive member is axially movable to and from said reel driving position, and said cam member comprises an annular plate pivotal between two positions about a portion of said reel, and having a beveled lug adapted to engage said drive member for controlling the axial movement thereof to and from said reel driving position.

4. The invention according to claim 3 wherein said portion of said reel has a tooth and said drive member is cup shaped having a closed end and has a complementary tooth on said closed end and further houses a spring for axially urging said drive member to said reel driving position in which said teeth are in driving engagement with one another.

5. The invention according to claim 2 wherein said stopping means comprises a fan blade driven by said spring motor, and a shoulder adapted to intercept said fan blade to stop said spring motor after it has been released.

6. The invention according to claim 5 wherein said latch for said measuring member and said shoulder of said stopping means comprise parts of a pivotal lever which is biased by a spring into a latching position in which said parts engage said measuring roll and fan blade for releasably holding the same, and said cam member has a lug adapted to engage said pivotal lever for moving same from said latching position for releasing said measuring member and said fan blade upon movement of said cam member to its second position.

References Cited in the file of this patent

UNITED STATES PATENTS

| | | |
|---|---|---|
| 1,201,002 | Treadaway et al. | Oct. 10, 1916 |
| 2,140,445 | Mihalyi | Dec. 13, 1938 |
| 2,182,133 | Moomaw | Dec. 5, 1939 |
| 2,241,122 | Drotning | May 6, 1941 |
| 2,350,693 | Moomaw et al. | June 6, 1944 |
| 2,402,149 | Crumrine | June 18, 1946 |
| 2,930,303 | Sago et al. | Mar. 29, 1960 |
| 3,014,673 | Lange | Dec. 26, 1961 |